United States Patent
Lester et al.

(10) Patent No.: US 11,331,844 B2
(45) Date of Patent: May 17, 2022

(54) CONTAINER HAVING COORDINATED MOLD PART LINE AND LONGITUDINAL SEAM

(71) Applicant: The Procter & Gamble Company, Cincinnati, OH (US)

(72) Inventors: Joseph Craig Lester, Liberty Township, OH (US); Joseph Neltner, Cincinnati, OH (US); Glenn Anthony Lauer, California, KY (US); Kevin Wood, Cincinnati, OH (US); Jun You, West Chester, OH (US); Marko Stojanovic, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 775 days.

(21) Appl. No.: 15/989,607

(22) Filed: May 25, 2018

(65) Prior Publication Data

US 2019/0358887 A1 Nov. 28, 2019

(51) Int. Cl.
*B29C 49/24* (2006.01)

(52) U.S. Cl.
CPC ...... *B29C 49/24* (2013.01); *B29C 2049/2404* (2013.01); *B29C 2049/2474* (2013.01); *B29C 2049/2477* (2013.01)

(58) Field of Classification Search
CPC ............ B29C 49/24; B29C 2049/2404; B29C 2049/2477; B65D 1/023; B65D 25/205; B65D 2203/00
See application file for complete search history.

(56) References Cited

U.S. PATENT DOCUMENTS

| | | | |
|---|---|---|---|
| 2,194,147 | A | 3/1940 | Alfons |
| 3,307,738 | A | 3/1967 | Theodore |
| 3,422,174 | A | 1/1969 | Hagen |
| 3,700,513 | A | 10/1972 | Haberhauer |
| 4,116,607 | A | 9/1978 | Legrand |
| 4,624,821 | A | 11/1986 | Younkin |
| 4,948,001 | A | 8/1990 | Magly |
| 5,599,495 | A | 2/1997 | Krall |
| 5,628,417 | A | 5/1997 | Van |
| 5,730,694 | A | 3/1998 | Hagleitner |
| 5,813,197 | A | 9/1998 | Aguzzoli |

(Continued)

FOREIGN PATENT DOCUMENTS

| | | |
|---|---|---|
| CN | 107000297 A | 8/2017 |
| CN | 107000300 A | 8/2017 |

(Continued)

OTHER PUBLICATIONS

Ammon, Jim, Injection Molding: Mold Construction and Part Design, 20 pages, Sep. 4, 2008, http://idsa.sjsu.edu/Archive%20documents/injection%20molding%20lecture%2009-04-08.pdf.

(Continued)

*Primary Examiner* — Larry W Thrower
(74) *Attorney, Agent, or Firm* — Gary J. Foose

(57) ABSTRACT

A container including a longitudinal overlapping seam extending from an end seam and a mold part line extending from the closed end of the container to the open end of the container. The container wall consists of a one-piece thermoplastic substrate.

16 Claims, 19 Drawing Sheets

(56) References Cited

U.S. PATENT DOCUMENTS

| | | | |
|---|---|---|---|
| 10,532,847 | B2 | 1/2020 | Etesse |
| 2002/0066740 | A1 | 6/2002 | Hermodsson |
| 2005/0051574 | A1 | 3/2005 | Kesselman |
| 2005/0139569 | A1 | 6/2005 | Larsen |
| 2007/0090121 | A1 | 4/2007 | Harp |
| 2011/0303673 | A1 | 12/2011 | Wilkes |
| 2011/0315592 | A1 | 12/2011 | Pennington |
| 2012/0031870 | A1 | 2/2012 | Porter |
| 2014/0069943 | A1 | 3/2014 | Kunz |
| 2014/0072245 | A1 | 3/2014 | Dede |
| 2015/0096957 | A1 | 4/2015 | Etesse |
| 2015/0203236 | A1* | 7/2015 | Etesse ................ B65D 1/0207 215/43 |

FOREIGN PATENT DOCUMENTS

| | | |
|---|---|---|
| EP | 2321113 B1 | 1/2013 |
| FR | 2851227 A1 | 8/2004 |
| WO | WO9419240 A1 | 9/1994 |
| WO | WO2008062224 A1 | 5/2008 |
| WO | WO2010007004 A1 | 1/2010 |
| WO | WO2009144559 A3 | 8/2010 |
| WO | WO2012152433 A1 | 11/2012 |

OTHER PUBLICATIONS

Bockner, Gordon, The Agami Sheet-Fed Bottle, 2 pages, Jun. 15, 2011, Packaging Strategies News, http://digital.bnpmedia.com/article/The+Agami+Sheet-Fed+ Bottle/7 5 5819/72683/article.html.
Mekchai, Ratchaneekorn, Roll N Blow Thermoforming Machine, 4 pages, Apr. 18, 2011, Business France Thailand, http://www.youbuyfrance.com/th/Posts-2595-roll-n-blow-thermoformingmachine.

* cited by examiner

CONTAINER HAVING COORDINATED MOLD PART LINE AND LONGITUDINAL SEAM

FIELD OF THE INVENTION

A thermoformed container formed of a one-piece thermoplastic substrate.

BACKGROUND OF THE INVENTION

Blow molded containers can be fabricated from flat substrates. One process employed to manufacture such containers is to form the flat substrate into a tube in which one of the edges of the flat substrate overlap with the opposing edge. The overlapping portion is bonded to formed a coherent tube. The tube can be fed into a blow mold. The blow mold is closed and pinches the bottom of the tube. A blowing cane is present at the top part of the tube. Heated air is forced into the tube to thermoform the tube into conformance with the blow mold. The blow mold is then opened and the blown container is removed.

In the above described process, the blow molded container will have a mold part line on the finished container that is evidence of the shape of the fit between the parts of the mold. Typically blow molds are structured to have two halves having flat faces that fit tightly together. In reality, it is difficult to provide faces of the mold that fit exactly together. Since the tube is blown into a container using high pressure, the container nearly exactly conforms to the shape of the mold, including any imprecisions along borders of the mold cavity where the mold parts meet.

The mold part line on blow molded containers is an artifact of the blow molding process. Mold part lines are apparent, upon careful inspection, on containers made by extrusion blow molding and injection blow molding. They typically can be found opposite one another on the container wall. Ordinarily the mold lines are of minor concern since they make up only a small portion of the container wall.

For containers made by converting a flat substrate into the container, there is a longitudinal overlapping seam that runs from the end seam on the bottom of the container formed by pinching the tube closed to at least the neck portion proximal the open end. The longitudinal seam can be visually apparent since it is a portion of the container that typically has a greater wall thickness than other portions of the container and the outer presenting edge can protrude above the adjacent material constituting the container wall. Further, such containers have mold part lines. So, there are at least three disruptions on the external surface of the container.

The multiple disruptions on the external surface of a container made by converting a flat substrate into a container leave only a few locations where the longitudinal overlapping seam and mold part lines will not interfere with the label applied to the container. For instance, it may be unsightly to have a label on the external surface of the container and have the longitudinal overlapping seam or mold part lines pass beneath and label and stick out above and or below the label. Further, if the label is directly printed on the external surface of the container, the mold part lines and longitudinal overlapping seam may be too rough to print upon or the roughness may degrade the quality of the printed image.

With these limitations in mind, there is a continuing unaddressed need for containers formed from flat substrates that can be suitably labeled.

SUMMARY OF THE INVENTION

A container comprising: an open end; a closed end opposing the open end; a container wall extending longitudinally between the closed end and the open end about a longitudinal axis; an end seam extending at least partially across the closed end; a longitudinal overlapping seam extending from the end seam, a portion of the overlapping seam extending from the end seam and longitudinally along the container wall; and a mold part line extending from the closed end to the open end; wherein the open end is narrower than at least a portion of the container away from the open end of the container; wherein the closed end and the container wall consist of a one-piece thermoplastic substrate; wherein the container has a height extending between the open end and the closed end, wherein the overlapping seam along the container wall has an overlap magnitude at a location that is about 10% of the height away from the closed end; and wherein at a location that is about 10% of the height away from the closed end the mold part line and the overlapping seam are within a distance of one another of less than about five times the overlap magnitude.

DETAILED DESCRIPTION OF THE INVENTION

Figure 1:
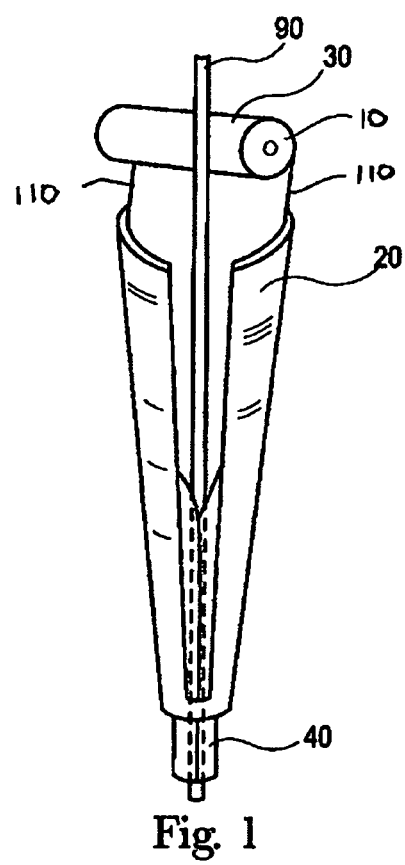
FIG. 1 is a drawing of an apparatus for forming a web into a loose conduit.

A container as contemplated herein can be formed as follows. First a web 30 can be provided wrapped around an unwinding roll 10, as shown in FIG. 1. The web 30 can be a planar web of thermoplastic sheet substrate. The web 30 can be a planar web of thermoplastic sheet substrate comprising a composition selected from the group consisting of polyethylene terephthalate, polystyrene, polypropylene, polyethylene, polyvinyl chloride, nylon, ethyl vinyl alcohol, and laminated sheets or mixtures thereof. The web 30 can be a multi-layer sheet or web of material. The web 30 can comprise a polyolefin. The web 30 can have a thickness of between about 200 µm and about 2000 µm. The web 30 can have a thickness of between about 200 µm and about 1000 µm. The web 30 can have a thickness of between about 300 µm and about 800 µm. The web 30 can comprise an ethylene vinyl alcohol (EVOH) layer having thickness between about 1 µm and about 30 µm, or even about 10 µm and about 30 µm. The web 30 can comprise an EVOH layer having thickness between about 10 µm and about 30 µm sandwiched between two layers of polyolefin material. The web 30 can have a pair of web lateral edges 110 spaced apart from one another in the cross direction CD.

The web 30 can be a laminate of different materials. The web 30 can be a co-extrusion of different materials. The web 30 can consist of a singular polymeric material. The web 30 can have one or more barrier layers. Since it is generally thought to be less complicated to form flat webs comprised of multiple layers than it is to form multi-layered containers by the processes of extrusion blow molding, injection blow molding, injection stretch blow molding, and the like, the process disclosed herein of forming a planar web into a container and the resulting containers are thought to be particularly practical. The web 30 can be fed through a forming guide 20 to gradually form the planar web 30 into a loose conduit 40. The forming guide 20 can be a funnel or be a section of a funnel or a portion of a funnel. The forming guide 20 can be a plate of metal or plastic having a shape such that as the web 30 is unwound from the roll 10, the web 30 is gradually deformed into the shape of a loose conduit 40 in a manner such that the loose conduit is free from wrinkles, folds, or creases. The forming guide 20 can be a solid material or can be provided with one or more of apertures, slots, grooves, ridges, and the like to help the flat web 30 be transitioned from a flat web 30 into loose conduit 40. The forming guide 20 can be a series of wires set in a frame to have the shape of a funnel or a section of funnel or portion of a funnel. The forming guide 20 can be comprises of a mesh or screen material. In essence, the forming guide 20 need only to be able to assist in transitioning the flat web 30 into loose conduit 40. The web 30 moves through the forming guide 20 to be formed into loose conduit 40. The web 30 and loose conduit 40 move towards the conformer. Movement of the web 30 and loose conduit 40 can be indexed with opening and closing of the conformer so as to move when the conformer is in an open position.

The forming guide 20 can be set around a blowing cane 90 that extends through the forming guide 20 such that that loose conduit 40 is wrapped around or partially around the blowing cane 90. The blowing cane 90 provides for pressurized and or heated gas that is used in a subsequent portion of the process to form the container by blow molding.

Figure 2:
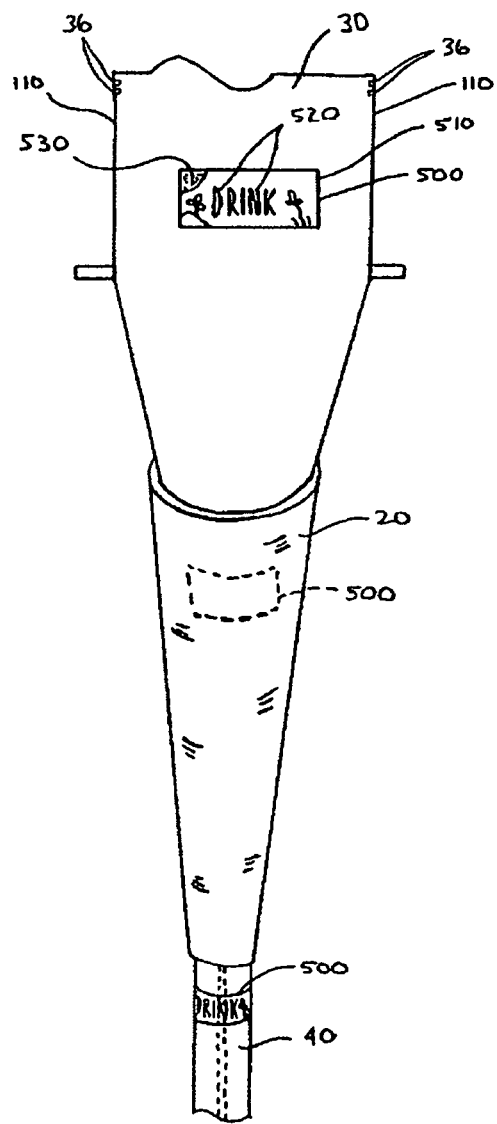
FIG. 2 is a drawing of a web having a label before and after feeding through a forming guide.

The web 30 can be provided with a label 500, as shown in FIG. 2. The label 500 can comprise a label substrate 510 and ink 520. The label can comprise foil. The label 500 can be adhered to the web 30 by an adhesive 530 between the label substrate 510 and the web 30. The label 500 can be thermal bonded to the web 30. The label 500 can be applied to the web 30 in a process that is continuous or intermittent with the process of transitioning the flat web 30 into the loose conduit 40. Optionally, the web 30 can be provided with the label 500 already applied thereto. That arrangement can decouple the process of applying the label 500 to the web 30 from the process of transitioning the flat web 30 into the loose conduit 40 and further converting into a finished container.

The web 30 can be provided with one or more registration marks 36 as is known in the art to aid with automated web control so that the web 30 is positioned properly during the operations performed to transform the web 30 into a container.

The label 500 can be can be positioned on the web 30 in any position as desired, accounting for deformation of the web 30 that occurs as the web 30 is transformed into loose conduit 40 and further converted into the finished container. The label 500 can cover less than about 50% of the surface of the web 30 that ultimate becomes the external surface finished container.

As shown in FIG. 2, the label includes text. The text is distortion printed so that when the container is blown the letters of the text have the proper height to width ratio. As shown in FIG. 2, each letter of the text is taller than it is wide. When the label 500 is stretched in the cross direction, each letter of the text will be stretched in the cross direction and the font of each letter will have the desired aspect ratio of height to width. Distortion printing is the printing of a scaled image or text on a label and then that label is controllably stretched in one or more directions so that the scaled image ends up being the desired image in terms of dimensions.

Figure 3:
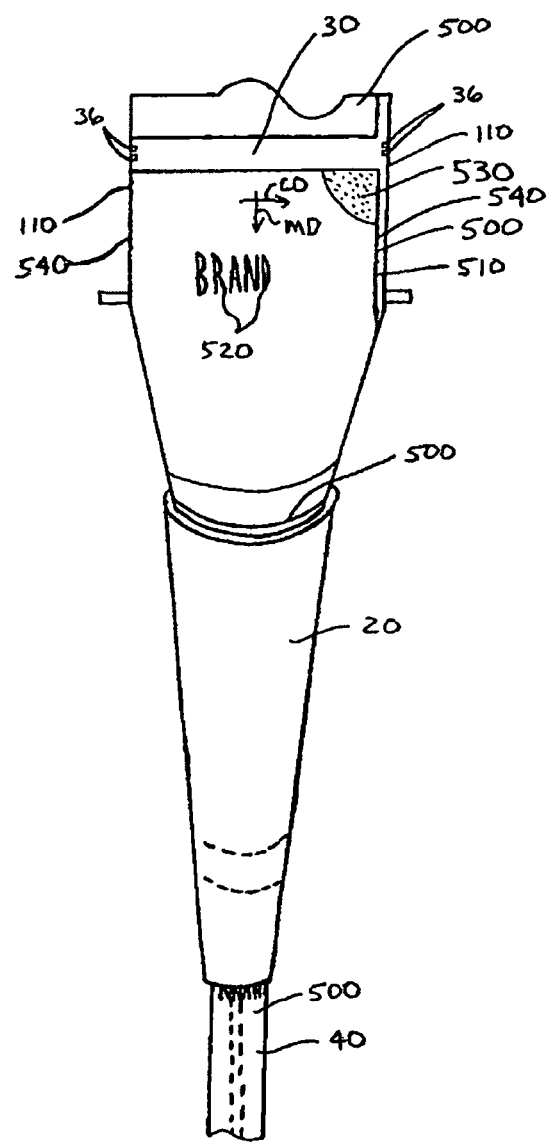
FIG. 3 is a drawing of a web having a label before and after feeding through a forming guide.

Optionally, the label 500 can be so extensive in the cross direction CD that that the label 500 extends about the entire periphery of the external surface of the finished container, by way of nonlimiting example as shown in FIG. 3. The label 500 in FIG. 3 is distortion printed, which is apparent by the letters appearing to be too skinny relative to their height. The label 500 can have a pair of label lateral edges 540 spaced apart from one another in the cross direction CD. One of the label lateral edges 540 can be coincident or substantially coincident with a web lateral edge 110. The other label lateral edge 540 can be spaced apart from the other web lateral edge 110. The label 500 can be so extensive in the machine direction MD that the label 500 extends onto the external surface of the closed end of the finished container. One or more labels 500 may be provided. And the label 500 or labels 500 may have any desired shape.

Figure 4:
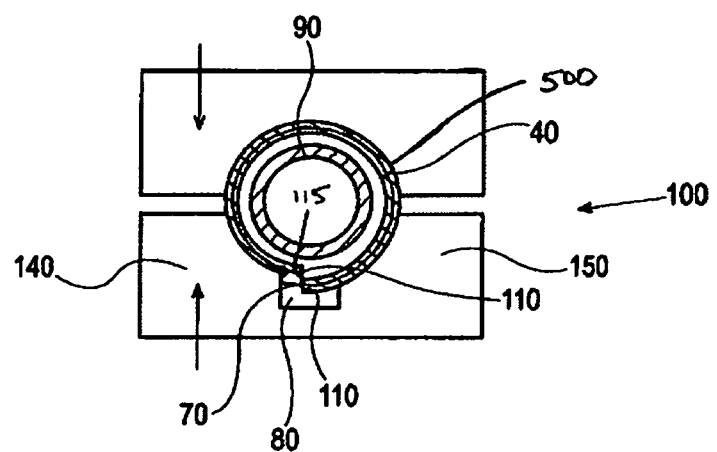
FIG. 4 is a drawing of the conformer in an open position.

The loose conduit 40 is fed into the conformer 100, as shown in FIG. 4. FIG. 4 is a top view of the conformer 100 in which the sections of the blowing cane 90 and loose conduit 40 are rendered. As shown in FIG. 4, the blowing cane 90 and loose conduit 40 fit within the conformer 100. The blowing cane 90 extends through the conformer 100 further down into the process. The loose conduit 40 is fed into the conformer 100 with the conformer 100 in an open position, as shown in FIG. 4 in which the first half 50 and second half 60 of the conformer 100 are in an open position. The conformer 100 comprises a first half 50 and a second half 60, the first half 50 and second half 60 being mounted about the blowing cane 90 and loose conduit 40. The first half 50 and second half 60 can translate towards and away from the blowing cane 90 and loose conduit 40. A hydraulic, lever, chain, or other mechanical system can be provided to translate the first half 50 and second half 60 of the conformer 100 towards and away from the blowing cane 90 and loose conduit 40. The second half 60 of the conformer 100 can be provided with an abutment 70 against which a lateral edge 110 of the loose conduit 40 can abut. As the loose conduit 40 is fed into the conformer 100, a lateral edge 110 of the loose conduit 40 can abut against the abutment 70 to true up lateral edges 110 of the loose conduit 40 with respect to one another so that the lateral edges 110 of the loose conduit 40 are parallel to one another and in an overlapping relationship with respect to one another.

If the label 500 is to extend about the entire periphery of the external surface of the finished container, the loose conduit 50 can be arranged so that the web lateral edge 110 of the web 40 that has a label lateral edge 540 coincident therewith or substantially coincident therewith is up against the abutment 70. The label 500 can extend from the web lateral edge 110 against the abutment 70 towards the opposing lateral edge 110 and leave a portion of the other web lateral edge 110 uncovered by the label 500. Arranged as such, the label 500 does not cover the web lateral edge 110 that slides past the abutment 70 when the conformer 100 is closed and a portion of the web 40 adjacent such lateral edge 110. The uncovered portion of the web 40 can be conveniently bonded to the internal surface 115 of web 40 near the web lateral edge 110 that has label 500 positioned there above, neither surface of which has the label 500 disposed thereon.

Figure 5:
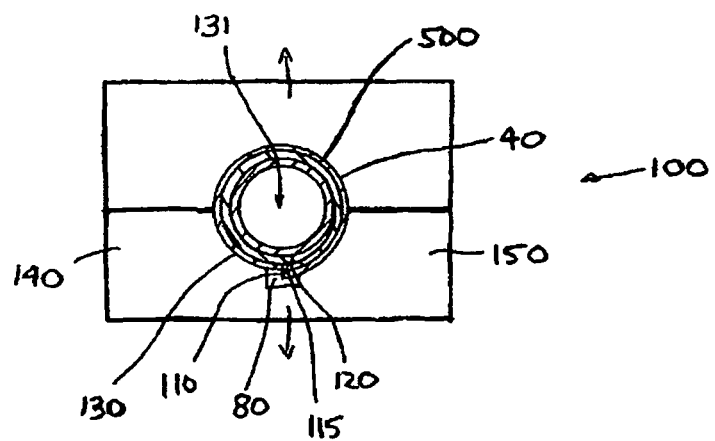
FIG. 5 is a drawing of the conformer in a closed position.

The conformer 100 can be provided with a bonding implement 80 proximal the abutment 70. The bonding implement 80 can be an ultrasonic bonding apparatus or thermal bonding apparatus. When the conformer 100 is in the closed position, the bonding implement 80 can bond an overlapping portion 120 of the loose conduit 40 to form the intermediate tube 130. The bonded overlapping portion 120 becomes the overlapping seam on the container. The intermediate tube 130 can be described as being like a hose having an overlapping seam extending along the length of the hose. The abutment 70 can extend through the conformer 100 and the abutment 70 can be parallel to the direction of movement of the loose conduit 40. Described otherwise, the abutment 70 can extend partially along or completely along the second half 60 of the conformer 100 orthogonal to the direction of translation of the first mold half 50 and or second mold half 60. The second mold half 60 of the conformer 100 can have a first quarter 140 and a second quarter 150 with the first quarter 140 and second quarter 150 offset with respect to one another at the abutment 70. The amount of the offset can be greater than or equal to the thickness of the web 30. Sized and dimensioned as such, when the conformer 100 is transitioned from the open position shown in FIG. 4 to the closed position as shown in FIG. 5, one edge of the loose conduit 40 can slide over or fit within the other edge of the loose conduit 40 so as to be in an overlapping relationship wherein the lateral edges 110 of the loose conduit are moved into an overlapping relationship such the lateral edges 110 are parallel to one another. The loose conduit 40 can have a cross section that is an approximately cylindrical shape.

The loose conduit 40 can have a cross section that is an approximately oval shape. The first mold half 50 and the second mold half 60, and the portions thereof that are the first quarter 140 and second quarter 150, can be shaped to provide the desired shape of the loose conduit 40 and ultimately the desired shape of the intermediate tube 130 that is formed when the conformer 100 is closed and the overlapping portion 120 is bonded. The intermediate tube 130 can have an intermediate tube open area 131 that is the interior cross sectional area of the intermediate tube 130 measured orthogonal to the machine direction. As shown in FIG. 5, the loose conduit 40 can have a cross section that is an approximately tubular shape. The actual shape of the loose conduit 40 is not critical so long as loose conduit can be positioned about the blowing cane 90. The loose conduit 40 can fit around the blowing cane 90 and can move along the length of the blowing cane 90 in the machine direction MD. The machine direction MD is the direction of travel of the web 30, loose conduit 40, intermediate tube 130, and container 200 in the process of making the container 200.

Figure 6:
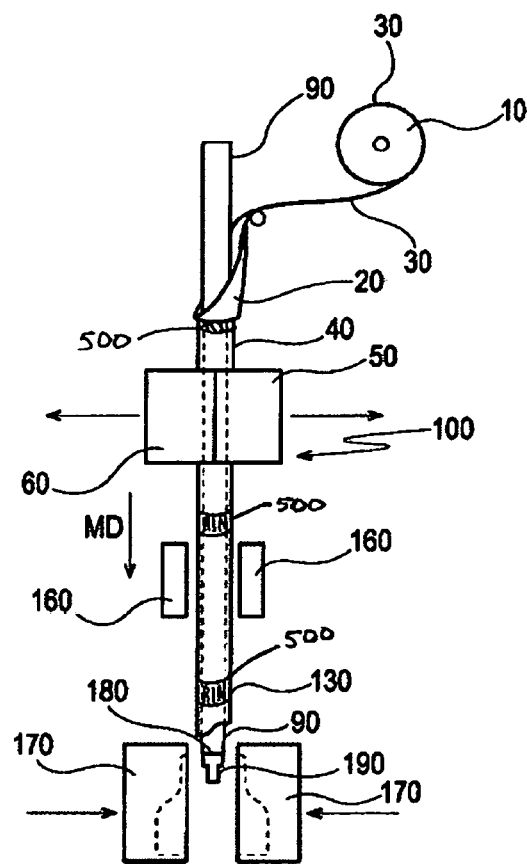
FIG. 6 is a drawing of an apparatus for forming a container.

After the intermediate tube 130 is formed, the intermediate tube 130 can pass through a pre-heater 160. The pre-heater 160 can heat the intermediate tube 130 such that when the intermediate tube 130 enters the blow mold 170, the intermediate tube 130 is at a temperature such that the preform, which is formed from the intermediate tube 130, can be blow molded into container. As shown in FIG. 6, the blowing cane 90 extends through the forming guide 20, loose conduit 40, conformer 100, and intermediate tube 130. The blowing cane 90 extends into the blow mold 170. The blowing cane 90 can provide gas, such as air to blow mold the finished container. The blow mold 170 defines a cavity into which the preform is blown to form the finished container. The cavity defined by the blow mold 170 can have the shape of the finished container. Blow molding is a thermoforming process that imparts certain physical attributes to the finished container. The blow mold 170 can be a heated blow mold 170.

Figure 7:
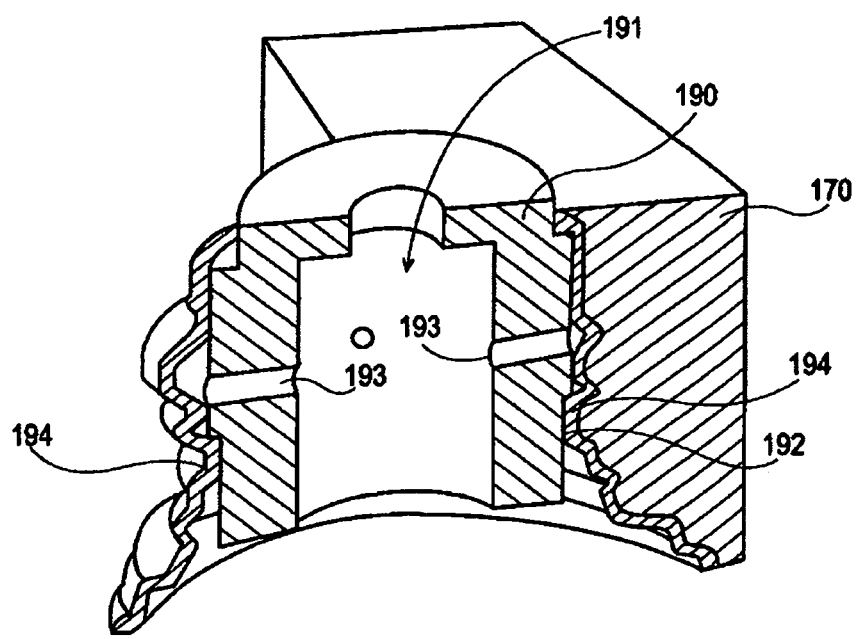
FIG. 7 is a partial view of a blow mold engaged with a calibration mandrel and a blown container.

A mandrel 192 extends from the blowing cane terminus 180. The mandrel 192 can be a calibration mandrel 190 if a calibrated neck is desired for the finished container. The mandrel 192 or calibration mandrel 190 can be used to define the open end of the container. A cross section of a calibration mandrel 190 is shown in FIG. 7. The calibration mandrel 190 has an interior portion 191 and a bearing surface 192. The interior portion 191 is in fluid communication with the blowing cane 90 and comprises one or more ports 193 in fluid communication with the interior portion 191.

Figure 8:
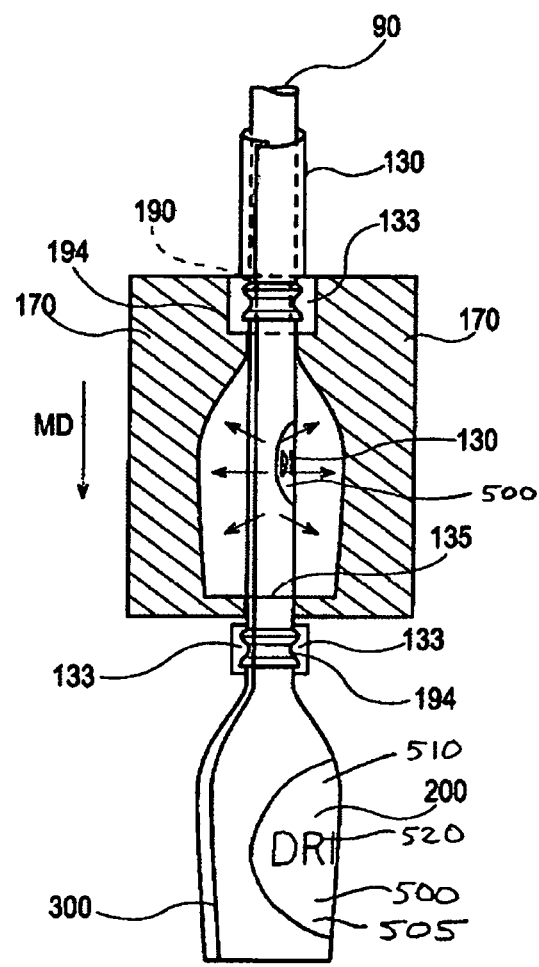
FIG. 8 cutaway view of an intermediate tube in a closed blow mold.

The intermediate tube 130 can be advanced over the blowing cane 90 and mandrel 192, or calibration mandrel 190 if provided, that is attached to the blowing cane 90. Once the intermediate tube 130 is in the blow molding position, the halves of the blow mold 170 close upon the intermediate tube 130. The blow mold 170 encloses a portion of the intermediate tube 130 and conforms at least a portion of the intermediate tube 130 to at least a portion of the mandrel 192, or calibration mandrel 190 if provided, as shown in FIG. 8. The intermediate tube 130 fits over the mandrel 192, or calibration mandrel 190 if provided, as the intermediate tube 130 moves in the machine direction MD. When the blow mold 170 closes about the intermediate tube 130, the blow mold 170 conforms the portion of the intermediate tube 130 that will define the open end of the container to mandrel 192, or the calibration mandrel 190 if provided.

If a calibration mandrel 190 is used, since the intermediate tube 130 loosely fits over the calibration mandrel 190, there is an excess of material that arises as the blow mold 170 closes upon the intermediate tube 130 and conforms the intermediate tube 130 to the calibration mandrel 190. The excess of material yields two flashings 133 proximal the location where the halves of the blow mold 170 meet. The amount of material in the flashing roughly corresponds with the amount of the intermediate tube 130 that can be eliminated so as to yield an open end of the container that has an open area orthogonal to the machine direction MD less than open area of the intermediate tube in that same direction. Thus, employing the calibration mandrel 190 as such allows the preform, which is formed from the intermediate tube 130, to be formed into a container having an open end that has a smaller open area orthogonal to the machine direction MD than the open area of the preform or intermediate tube 130 orthogonal to the machine direction MD. Without employing a calibration mandrel 190, the open end has the same or greater open area orthogonal to the machine direction MD as the open area of the intermediate tube 130 orthogonal to the machine direction MD. Such a container design may not be practical for containers having a narrow open end, such as a toothpaste tube.

As the halves of the blow mold 170 close upon the intermediate tube 130, the blow mold halves apply bearing pressure to the bonded overlapping portion 120 of the intermediate tube 130 against the underlying mandrel 192 or calibration mandrel 190 to form the neck 194 and compress out the overlapping portion 120 so that the overlapping portion 120 that subsequently becomes the overlapping portion of the container in the neck portion of the container is not as defined as the overlapping portion 120 of the intermediate tube 130 prior to passing through the blow mold 170 or the overlapping portion 120 that ends up forming the overlapping seam of the container. The neck 194 can be a calibrated neck.

The intermediate tube 130 is closed at a pinch seam 135 formed where the halves of the blow mold 170 close at the bottom of the blow mold 170, with that portion of the intermediate tube 130 ultimately becoming the closed end of the container 200.

As shown in FIG. 8, the text on the label 500 in the blown container 200 has an appropriate height to width ratio of the characters, as opposed to the label 500 in the blow mold 170 prior to blowing, which has characters that are too skinny relative to their height.

Figure 9:
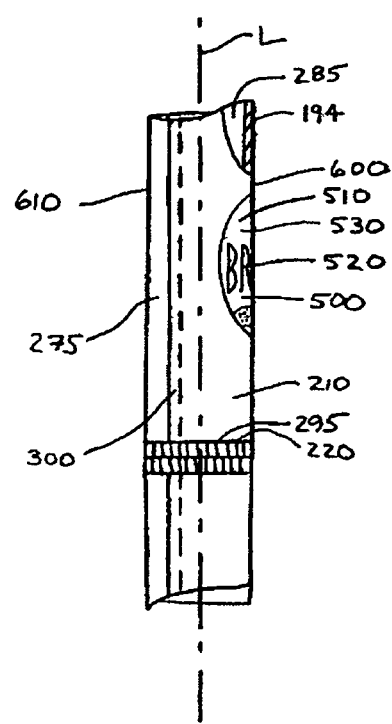
FIG. 9 is a preform having a label.

Once the pinch seam 135 is formed, the preform 600 for making the container is established (FIG. 9). The preform 600 has a closed end 220. A preform wall 610 extends longitudinally from the closed end 220 about a longitudinal axis L. The preform wall 610 has an external surface 275 that is outwardly oriented and an opposing internal surface 285. The preform 600 has an end seam 295 (pinch seam 135) extending across the closed end 220. The preform 600 has a longitudinal overlapping seam 300 extending along the preform wall 610 from the end seam 295. The preform 600 can further comprise a label 500 bonded to the external surface 275. The label 500 can be bonded to the external surface 275 by an adhesive 530, thermal bonded to the external surface 275, or otherwise bonded to the external surface 275. The label 500 can comprise a label substrate 510 and ink 520 disposed on the label substrate 510. A common one-piece thermoplastic substrate 210 forms both the closed end 220 and the preform wall 610. The preform 600 can be considered to have a neck 194 opposing the closed end 220. The neck 194 of the preform may have the same cross section shape as the preform 600 below the neck 194. The neck 194 of the preform is the part of the preform that ultimately becomes the neck 194 of the container 200. The preform wall 610 can extend longitudinally between the closed end 220 and the neck 194. Further, the longitudinal overlapping seam 300 can extend along the preform wall 610 from the end seam 295 to the neck 194, the neck 194 being proximal the open end 230.

Figure 10:
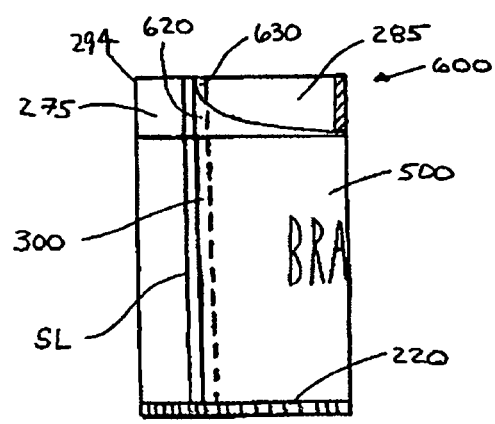
FIG. 10 is a preform having a label.

If the preform 600 is provided as an individual preform 600, the preform 600 has an open end 230 opposing the closed end 220. The preform wall 610 extends longitudinally between the closed end 220 and the open end 230 about a longitudinal axis L. The preform 600 has a longitudinal overlapping seam 300 extending along the preform wall 610 from the end seam 295 to the open end 230. A preform 600 that has a label 500 extending about the entire periphery at some location along the preform 600 is shown in FIG. 10. As shown in FIG. 10, the overlapping seam 300 can comprise an outer portion 620 that is part of the external surface 275 of the preform 600 and an underlying inner portion 630. The outer portion 620 can comprise the label 500 and the inner portion 630 can be devoid of the label 500. Arranged as such, the label 500 does not end up being between the outer portion 620 and inner portion 630 of the overlapping seam 300. That can simplify bonding the outer portion 620 to the inner portion 630 when forming the intermediate tube 130 and ultimately provide for a structurally robust finished container 200 that does not fail along the overlapping seam 300 during intended use.

If the label 500 is desired to be part of the closed end 220 of the finished container, the label 500 can extend onto the closed end 220 of the preform 600. The label 500 can extend from the closed end 220 of the preform 600 towards the open end 230 of the preform 600. Since the label 500 is on the external surface 275 of the intermediate tube 130 and the closed end 220 of the preform 600 is formed by pinching the intermediate tube 130, the label will not interfere with the end seam 295.

The overlapping seam 300 of the preform 600 can be considered to have an overlapping seam length SL measured from the end seam 295 along the preform 600 to the neck 194 of the preform 600. The label 500 can cover from about 80% to about 100% of the overlapping seam length SL.

Blowing air or gas, optionally heated or cooled, is blown into the preform 600 below the mandrel 192, or calibration mandrel 190 if provided, and blows out the preform 600 into conformance with the halves of the blow mold 170. Prior to, during, or after blow molding the container 200, the blow mold 170, blowing cane 90, and mandrel 192, or calibration mandrel 190 if provided, can move in the machine direction MD to pull the preform 600, intermediate tube 130, loose conduit 40, and web 30 along in the machine direction MD to advance the process in an indexed manner.

After the container 200 is blow molded and advanced, the blow mold 170 can be opened. Then the blow mold 170 and the mandrel 192, or calibration mandrel 190 if provided, can be moved upstream relative to the machine direction MD. Once the blow mold 170 and mandrel 192, or calibration mandrel 190 if provided, are in the proper position, the blow mold 170 can be closed upon the next portion of the intermediate tube 130 and the steps repeated to form another container 200.

Figure 11:
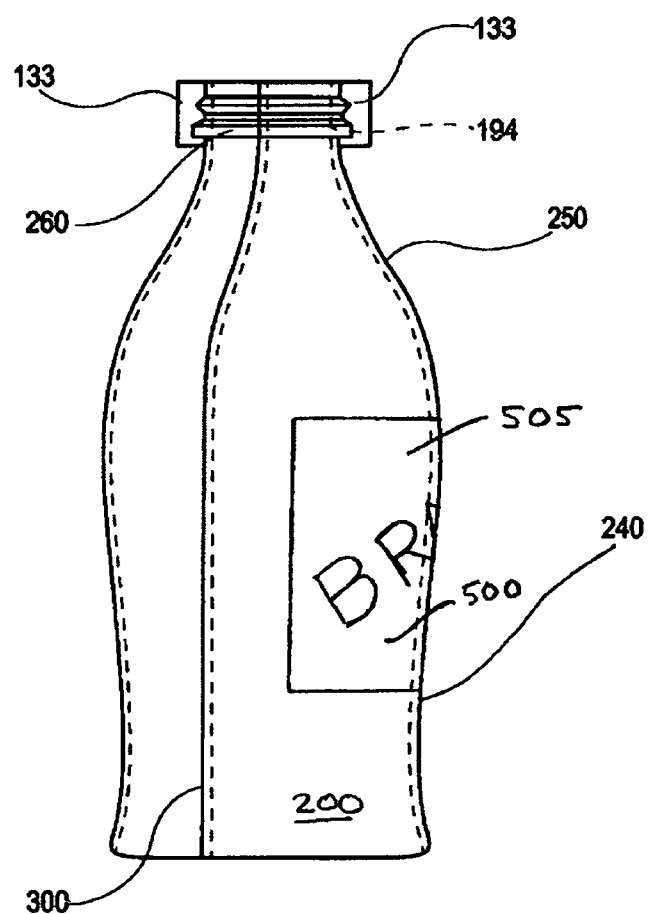
FIG. 11 is side view of a container after blow molding.

The finished container 200 can be cut from the material upstream of the finished container 200. The cut can be made at or slightly above the neck 194 to leave the neck 194 and other portions of the container 200 intact. If a calibrated neck 194 is provided by employing a calibration mandrel 190, any resulting flashings 133 can be removed from the container 200 via a cutting or breaking operation or removed by hand. A side view of a container 200 in which the flashings 133 are still attached to the container 200 in the neck portion 260 proximal the open end 230 is shown in FIG. 11. The flashings 133 can be thin fin protrusions extending away from the neck portion 260. Stated otherwise, the neck portion 260 can comprise two longitudinally extending flashings 133 projecting away from the longitudinal axis L on opposite sides of the neck portion 260. The neck portion 260 is proximal the open end 230.

Also shown in FIG. 11 is the mold part line 205. The mold part line 205 can extend from the closed end 220 to the open end 230. The mold part line 205 is the part of the container wall 270 that is formed at the location where the parts or halves of the blow mold 170 meet. The mold part line 205 can be a straight line that follows the contour of the container 200 from the closed end 220 to the open end 230. The mold part line 205 will be a straight line if the parts of the blow mold 170 meet in a straight line. Optionally, the mold part line 205 may have some other shape that matches the part line of the blow mold 170. The mold part line 205 is formed in the container 200 when the preform 600 is blow molded into conformance with the blow mold 170. The halves of the blow mold 170 may imprecisely fit together and leave a small gap. That is, the mold cavity within the blow mold 170 may not be precisely smooth across the halves of the blow mold 170. During blow molding, the thermoplastic substrate being blow molded is flowable to some degree. The thermoplastic substrate may flow to fill any disconformity between the halves of the blow mold 170.

After blowing of the container 200 is complete, the halves of the blow mold 170 open and the container 200 is removed. The locations on the external surface 275 of the container 200 that were blown up against the portion of the mold cavity defined by the intersection of the halves of the blow mold 170 will have a mold part line 205.

The container 200 can have an additional mold part line 205 that extends from the closed end 220 to the open end 230. Commonly, the blow mold 170 is split into two halves. The portion of the mold cavity in each half of the blow mold 170 forms 180 degrees of the container wall 270 about the longitudinal axis L of the container 200 at any location along the longitudinal axis L between the closed end 220 and the open end 230. In such an arrangement, the mold part lines 205 are on opposite sides of the container 200.

Figure 12:
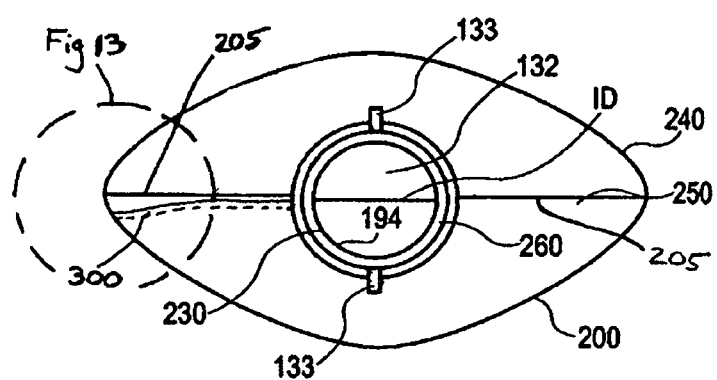
FIG. 12 is a top view of a container showing the open end.

A top view of a container 200 in which the flashings 133 are still attached to the container 200 in the neck portion 260 proximal the open end 230 is shown in FIG. 12. The inside diameter ID is illustrated in FIG. 12. The calibrated neck 194 can have a calibrated neck open area 132, the open area measured orthogonal to the longitudinal axis L of the container 200. The longitudinal axis L of the container 200 pass through the center of the open end 230. Since in making the container 200 with a calibrated neck 194 the intermediate tube 130 is forced into the calibration mandrel 190 to form the calibrated neck 194, the calibrated neck open area 132 is less than the intermediate tube open area 131. The tolerance of the inside diameter ID can be plus or minus about 2% of the inside diameter ID. That is, all inside diameters ID measured at the open end 230 will be within plus or minus about 2% of one another, or even plus or minus about 1.2% of one another, or even plus or minus about 1% of one another.

Figure 13:
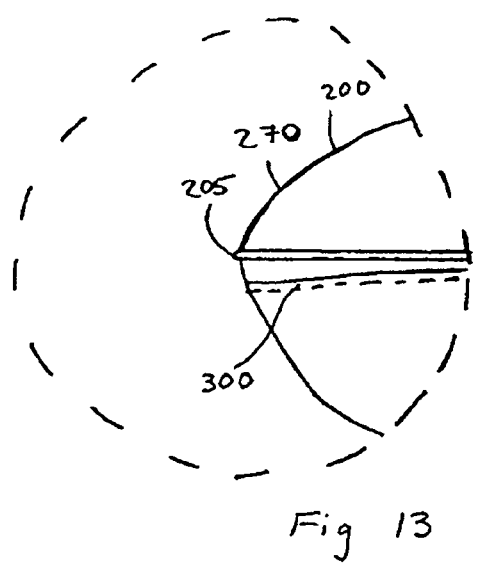
FIG. 13 is a cut-away view of a portion of FIG. 12.

A cutout view of the container in FIG. 12 is shown in FIG. 13. As shown in FIG. 13, the part line 205 can protrude from the container wall 270. The mold part line 205 can be visually detected by close observation of the container wall 270. The mold part line 205 will be a discontinuity in the container wall 270 as compared to parts of the container wall 270 immediately adjacent the mold part line 205.

In the art of blow molded containers 200, containers 200 having a cylindrical cross section are common but have some technical deficiencies. Containers 200 having non-cylindrical cross sections along the longitudinal axis L can provide for improved packing of multiple containers 200 in a single package. Further, non-cylindrical cross sections can provide for a flat or flatter front upon which to label the container 200.

Figure 14:
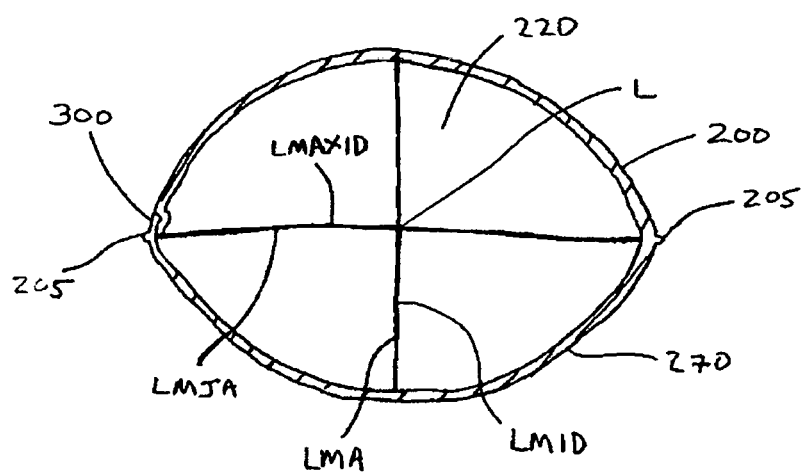
FIG. 14 is a cross sectional view of a container.

A cross section at mid-height of a container 200 having a non-cylindrical cross section is shown in FIG. 14. As shown in FIG. 14, the container wall 270 can extend around the longitudinal axis L. The longitudinal axis L can pass through the center of the open end 230. At mid-height along the longitudinal axis L, the container 200 can have a local maximum internal dimension LMAXID orthogonal to the longitudinal axis L. The container 200 can have a local major axis LMJA coincident with the local maximum internal dimension LMAXID.

The internal dimensions discussed herein are referred to in terms of local since the internal dimensions of the container 200 may vary along the longitudinal axis L. For example, the container 200 may have a large footprint at the closed end 220, then broaden laterally with increasing distance from the closed end 220, then taper towards the longitudinal axis L below, at, or slightly above mid-height of the container 200. From around mid-height of the container 200, the container wall 270 can further taper towards the longitudinal axis L up to the neck portion 260 and open end 230.

At mid-height along the longitudinal axis L, the container 200 can have a local minor axis LMA orthogonal to the local major axis LMJA. At mid-height along the longitudinal axis L, the container 200 can have a local minor internal dimension LMID coincident with the local minor axis LMA.

At mid-height along the longitudinal axis L, the container 200 can have a local aspect ratio defined as the ratio of the local maximum internal dimension LMAXID to the local minor internal dimension LMID. The local aspect ratio can be greater than about 1. A local aspect ratio greater than 1 is descriptive of a container 200 that has a non-cylindrical cross section at that location.

The local aspect ratio of a container 200 can vary as a function of height. As described herein, the dimensions and axes related to the local aspect ratio at any position along the longitudinal axis L are determined based on the local maximum internal dimension at the particular height along the longitudinal axis L that is being considered.

Figure 15:
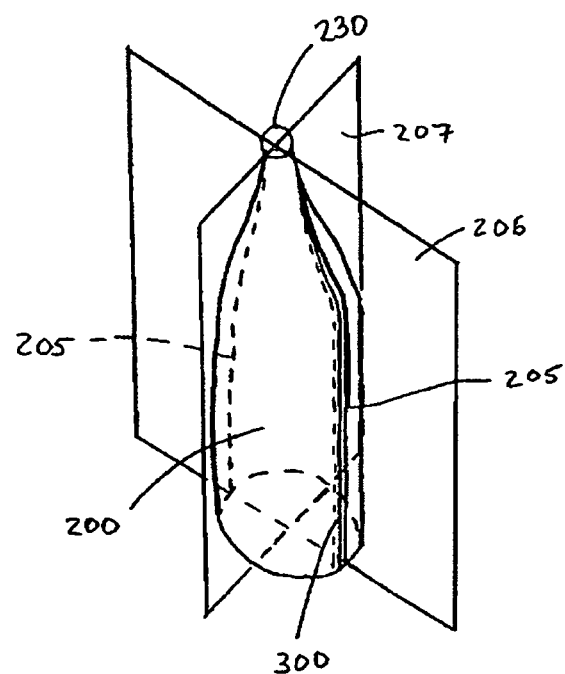
FIG. 15 is a perspective view of a container.

To provide for a large area that can be labeled in a high quality manner, it can be practical to position the mold part line 205 nearer to where a front plane 206 defined by the local major axis LMA and the longitudinal axis L intersects the container wall 270 than where a sagittal plane 207 defined by the local minor axis LMA and the longitudinal axis L intersects the container wall 270 (FIG. 15). The terms front plane 206 and sagittal plane 207 are used in their anatomical sense in regard to symmetry. The sagittal plane 207 divides the container 200 in left and right parts or halves. The front plane 206 divides the container 200 in front and back parts or halves. Providing the mold part line 205 near the front plane 207 section of the container 200 results in the mold part line 205 being positioned at the side of the container 200, with the front of the container 200 being the broader face of the container 200 that can be labeled without the mold part line 205 interfering with the label 500. Since the mold part line 205 and the overlapping seam 300 are within a distance of one another of less than about five times the overlap magnitude, both the mold part line 205 and the overlapping seam 300 can be out of the way of where the label 500 is positioned on the front of the container 200.

Advantageously, the mold part line 205 can be near to or coincident with where the front plane 206 intersects the container wall 270 so that both the overlapping seam 300 and the mold part line 205 are roughly in the same location on the container wall 270. That leaves the maximum area of the external surface 275 available for labeling. And, that provides for both the mold part line 205 and the overlapping seam 300 unobtrusively on or towards the side of the container 200 out of the way of the label 500 and out of view or only peripherally in view of an observer of the container 200 positioned on a shelf with the label 500 presented towards the viewer.

Containers 200 having a flatter front can be desirable to provide for a large surface that can be labeled, and presented to an observer when the containers 200 are on a shelf. The container 200 can have a local aspect ratio greater than about 1.3. Such containers 200 can provide for ample space for a label 500. Further, the label 500 can be spaced apart from the overlapping seam 300 and the mold part line 205 so that any irregularities that might exist in the contour of the external surface 275 of the container wall 270 do not interfere with physical or visual integrity of the label 500.

The mold part line 205 or mold part lines 205 can be positioned relative to the overlapping seam 300 by carefully aligning the intermediate tube 130 or preform 600 in the blow mold 170 so that the overlapping seam 300 is placed at, or immediately next to, or proximal where the first mold half 50 and the second mold half 60 meet. This can be accomplished by aligning the conformer 150, particularly the abutment 70 and the bonding implement 80 with the blow mold 170. The abutment 70 can be positioned in line with the position at which the first mold half 50 and the second mold half 60 meet.

Figure 16:
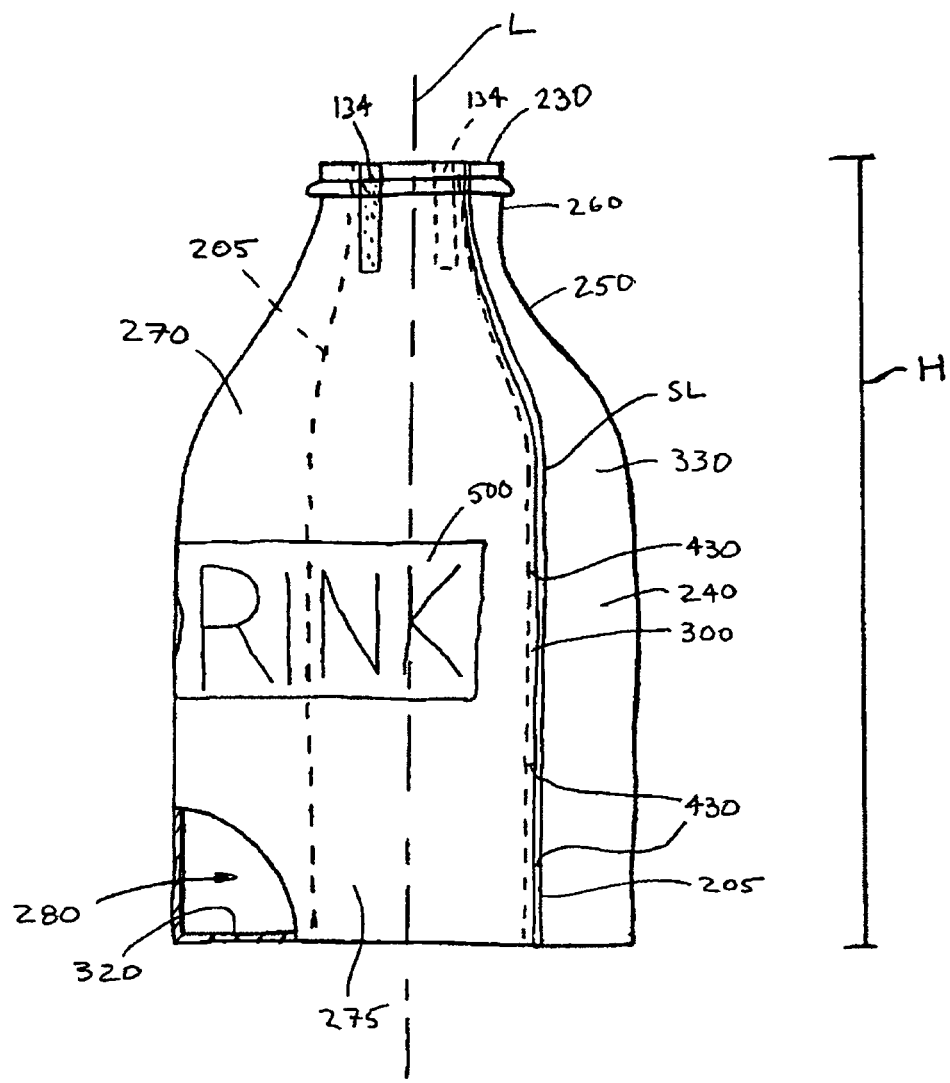
FIG. 16 is side view of a container after blow molding.

At the locations where the flashings 133 are removed from the container 200, two partially longitudinally extending flashing lines 134 can remain as evidence of the prior existence of the flashings 133, as shown in FIG. 16, by way of nonlimiting example.

The container wall 270 can be considered to have an interior surface 320 defining the interior volume 280 of the container and an external surface 275 opposing the interior surface (FIG. 16). Each of the main body portion 240, shoulder portion 250, and neck portion 260 can be considered to have an interior surface 320 and an external surface 275. The interior surface 320 can be oriented towards the longitudinal axis L and the external surface 275 can be oriented away from the longitudinal axis L.

With respect to the overlapping seam 300, the overlapping seam 300 can comprise an outer portion 302 that is part of the external surface 275 of the container 200 and an underlying inner portion 301, both the outer portion 302 and the inner portion 301 oriented away from the interior volume 280. The outer portion 302 can comprise the label 500 and the inner portion 302 can be devoid of the label 500. Such an arrangement is practical to avoid having the label 500 interfere with formation and integrity of the overlapping seam 300.

The label 500 can cover part of the overlapping seam 300. Optionally the stretched label can extend about the entire periphery of the container 200 at positions along the longitudinal axis L, the periphery being taken orthogonal to the longitudinal axis L. Such an arrangement can help to obscure the overlapping seam 300 from view to provide for a finished look to the container 200. The overlapping seam 300 can have an overlapping seam length SL measured from end seam 295 to the open end 230 of the container 200. The label 500 can cover more than about 80% of the overlapping seam length SL. Such an arrangement can help to obscure the overlapping seam 300 from view of the user of the container 200.

As shown in FIG. 16, at a location about 10% of the height H away from the closed end 220, the height H being the straight-line height between the closed end 220 and open end 230 parallel to the longitudinal axis L, the overlapping seam 300 along the container wall 270 can have an overlap magnitude 430 of more than about 1.5 times the thickness 440 of the container wall 270 as measured at a distance from the overlapping seam 300 equal to the magnitude of overlap 430. As a result of blow molding to form the container 200, the container 200 can have a variety of thicknesses at different locations on the container. For example, the thickness of the container wall 270 in the main body portion 240 may be different from the thickness of the closed end 220, shoulder portion 250, and neck portion 260. The overlap magnitude 430 may vary at different locations along the overlapping seam 300 along the height H of the container 200. To provide for a common location at which to measure the overlap magnitude 430 regardless of height H of the container 200, the comparison of the overlap magnitude 430 can be taken at a location about 10% of the height H away from the closed end 220 of the container 200. Without being bound by theory, it is thought that a representative measure of thickness of the container wall 270 can be taken at a distance from the overlapping seam equal to the overlap magnitude 430. Such location is relatively near the seam but yet not so far from the overlapping seam 300 so as to be at a completely different part of the container 200, such as at a handle, if present, or some other decorative or functional part of the container 200. Further, thickness of the container wall 270 at the overlapping seam 300 along the height H of the container may vary as a function of location. Greater overlap might be measured at the maximum axial dimension of the container 200 as compared to the shoulder portion 250 or neck portion 260 since that portion of the container is stretched more during formation of the container 200 than the shoulder portion 250 or neck portion 260. The overlapping seam 300 at a location about 10% of the height H away from the closed end 220 can be thicker than any other portion of the container wall 270 at about 10% of the height H away from the closed end.

At a location about 10% of the height H away from the closed end 220, the mold part line 205 and the overlapping seam can be within a distance of one another of less than about five times the overlap magnitude 430. Such an arrangement is practical for providing the mold part line 205 and the overlapping seam 300 near one another to minimize disruption of the external surface 275 with regard to labeling the container 200.

The overlap magnitude 430 can vary at different positions along the longitudinal axis L. This can occur as a result of different amounts of stretch required to convert the preform 600 into the container 200. The overlap magnitude 430 can be a minimum proximal the open end 230. This can be the situation for a container 200 having an open end 230 that has a smaller open cross sectional area than at other positions away from the open end 230 along the longitudinal axis L of the container 200.

Figure 17:
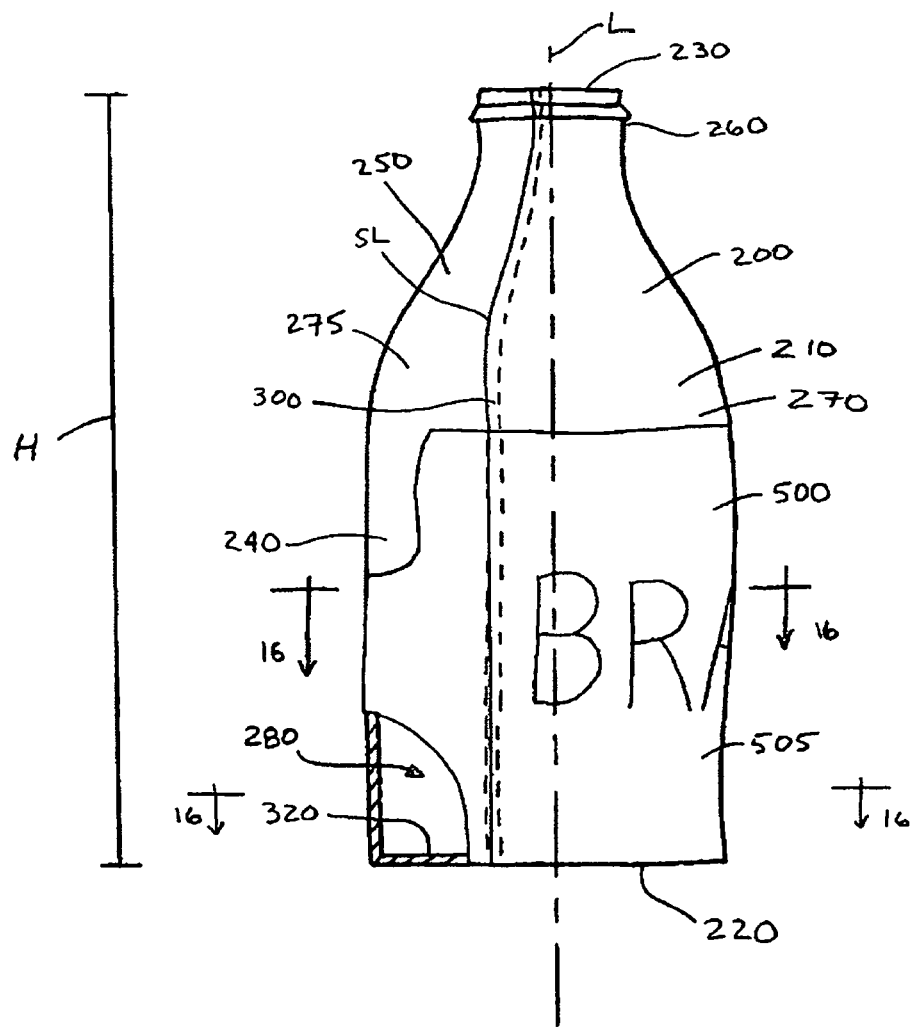
FIG. 17 is a drawing of a container, a portion of which is rendered in a section view to show the interior volume and interior surface of the container.

As shown in FIG. 17, the label 500 can extend around the entire external surface 275 of the container 200. Further, the label 500 can cover the mold part line 205. Such an arrangement can be practical for providing a larger portion of the external surface 275 with a label 500 and obscure the mold part line 205.

Figure 18:
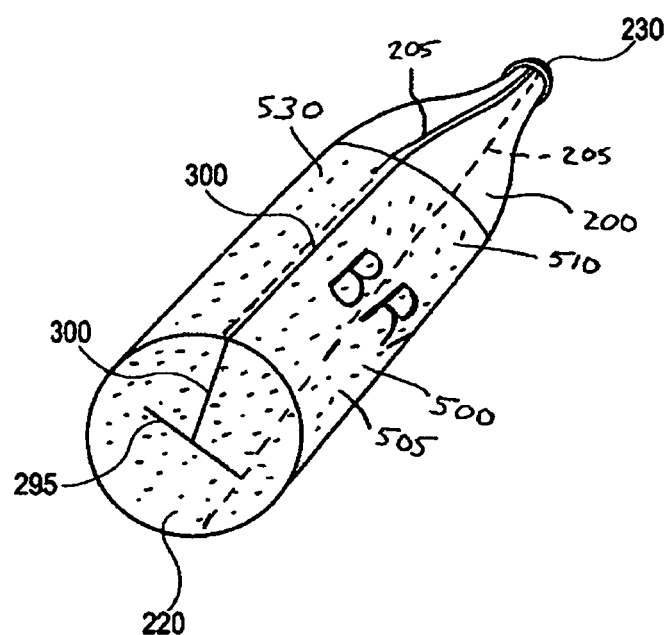
FIG. 18 is perspective view of container in which the closed end of the container is visible.

A perspective view of a container 200 showing the closed end 220 is shown in FIG. 18. As shown in FIG. 18, the container 200 can comprise an end seam 295 extending at least partially across the closed end 220 of the container. The end seam 295 can arise when the blow mold 170 is closed upon the intermediate tube 130. At that stage of the process the end seam 295 extends across the intermediate tube 130 to form the preform 600. Then the preform 600 is blown up to form the container 200. A portion of the closed end 220 of the container 200 can be formed of material that was formerly part of the preform wall 610 of the preform 600.

The container 200 can further comprise a longitudinal overlapping seam 300 extending from the end seam 295.

The longitudinal overlapping seam 300 can extend from any portion of the overlapping seam 200, for instance at one of the ends of the end seam 295 or at any location between ends of the end seam 295. A portion of the longitudinal overlapping seam 300 can extend longitudinally along the container wall 270 between the closed end 220 to the neck portion 260 of the container. This might occur if in the neck portion 260 the bonded overlapping portion 120 of the intermediate tube 130 ends up being part of flashing 133. A portion of the longitudinal overlapping seam 300 can extend longitudinally along the container wall 270 between the closed end 220 and the open end 230 of the container. This can occur if a calibrated neck 194 is not formed or in the case in which a calibrated neck 194 is formed and the bonded overlapping portion 120 of the intermediate tube 130 does not end up being part of the flashing 133.

The overlapping seam 300 can arise in the finished container 200 as a result of the conformer 100 closing upon loose conduit 40 in the process of forming the intermediate tube 130. The end seam 295 extending at least partially across the closed end 220 of the container can be a smoothed out pinch seam 135. That is the end seam 295 may be substantially smooth after a pinch seam 135 is formed in the intermediate tube 130 and the preform 600 is then deformed by blow molding to form the closed end 220 of the container.

The label 500 can extend onto the closed end 220, as shown in in FIG. 18. That can be provided for by applying the label 500 all the way or most of the way to the closed end 220 of the preform 600. Including the label 500 on the closed end 220 of the container 200 can simplify placement of the label 505 on the preform 600 since the longitudinal position of the label 500 on the preform may not need not be precisely controlled. Further, arranged as such, the bottom of the container 200 can be labeled or the label 505 can make the contents of the container 200 not visible or only partially visible from outside the container 200 and can help to prevent light from entering the container 200 that might spoil the contents therein.

A common one-piece thermoplastic substrate 210 can form both the closed end 220 and the container wall 270. That is, the closed end 220 and the container wall 270 are comprised of a common one-piece thermoplastic substrate 210. Stated otherwise, the closed end 220 and the container wall 270 are comprised of a common one-piece thermoplastic substrate 210. The closed end 220 and the container wall 270 being a unitary one-piece thermoplastic substrate 210 arises as the web 30 is transformed from a flat web to a three-dimensional shape. Stated otherwise, the closed end 220 and the container wall 270 can consist of or comprise a one-piece thermoplastic substrate 210. That is, together, the closed end 220 and the container wall 270 can be formed from a single portion of web 30 that is shaped into a structure that is subsequently blow molded into a container 200. Stated otherwise, the container 200 can be described as being free from seams other than a seam extending at least partially across the closed end 220 and an overlapping seam 300 extending from the end seam 295, a portion of the overlapping seam 300 extending longitudinally along the container wall 270 between the closed end 220 and the open end 230. This construction of the container 200, in which the entire neck portion 260, shoulder portion 250, container wall 270, and closed end 220 are formed of a single integral substrate is practical in that the manufacturer is not required to assemble different parts of the container. This is unlike the construction of containers such as toothpaste tubes that are presently in the market in which the shoulder portion 250 and neck portion 260 are typically formed from an injection molded plastic insert that is bonded to the container wall 270 that is formed from a flexible substrate.

It is also thought that by having the shoulder portion 250 and container wall 270 formed of a single integral substrate that there is less potential for a leak to occur at such location since there is no potential for a leaky bond between the shoulder portion 250 and the container wall 270. Stated otherwise, the juncture between the shoulder portion 250 and the container wall 270 can be free from a seam. Further, the juncture between the neck portion 260 and the shoulder portion 250 can be free from a seam forming the juncture. Further, the juncture between the shoulder portion 250 and the container wall 270 can be free from a seam forming the juncture.

Since the closed end 220 and container wall 270 consist of or are comprised of a single portion of web 30, the end seam 295 across at least a portion of the closed end 220 of the container extends to or connects to overlapping seam 300 extending longitudinally along the container wall 270. As such, the overlapping seam 300 can be continuous across the boundary between the closed end 220 and container wall 270. The overlapping seam 300 can extend along the height H of the container 200. The height H of the container extends between the closed end 220 and the open end 230.

Figure 19:
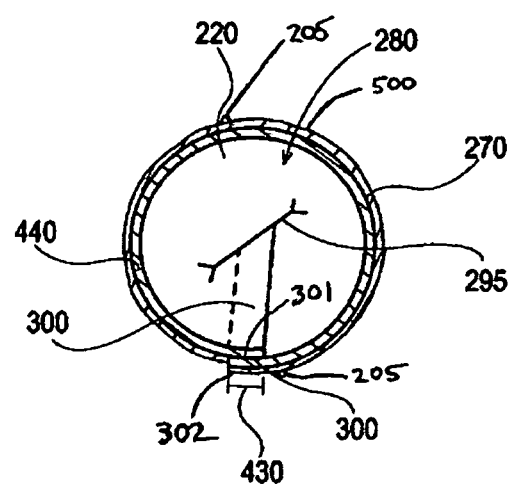
FIG. 19 is a cross section of the container of FIG. 17 as marked in FIG. 17.

A cross section of the container 200 shown in FIG. 17 is shown in FIG. 19, the view being taken to show the closed end 220. As shown in FIG. 19, the overlapping seam 300 can extend across part of the closed end 220. The overlapping seam 300 across part of the closed end 220 can be connected to the end seam 295. As shown in FIGS. 18 and 19, the overlapping seam 300 can extend from the end seam 295 across part of the closed end 220 of the container to the container wall 270 and longitudinally along the container wall 270 between the closed end 220 and open end 230. Stated otherwise, a portion of the longitudinal overlapping seam 300 can extend longitudinally along the container wall 270 between the closed end 220 and the open end 230 of the container and between the container wall 270 and the end seam 295. As such, the container 200 can comprise an overlapping seam 300 that is connected to the end seam 295 and extends partially across the closed end 220 of the container and longitudinally along at least part of the container wall 270 between the closed end 220 and the open end 230.

The closed end 220 can be sized and dimensioned so that the container 200 is free standing on the closed end 220. The thermoplastic substrate can comprise a composition selected from the group consisting of polyethylene terephthalate, polystyrene, polypropylene, polyethylene, polyvinyl chloride, nylon, ethyl vinyl alcohol, and mixtures thereof. The container 200 can have a height H extending between the closed end 22 and the open end 230 and the container wall 270 can have a thickness away from the overlapping seam 300, wherein at a location about 10% of the height H away from the closed end the overlapping seam 300 along the container wall 270 can have an overlap magnitude of more than about 1.5 times the thickness of the container wall 270 as measured at a distance from the overlapping seam 300 equal to the overlap magnitude. The container 200 can have a height H extending between the closed end 220 and the open end 230 and the container wall 270 has a thickness away from the overlapping seam 300, wherein the overlapping seam 300 at a location about 10% of the height H away from the closed end 220 is thicker than any other portion of the container wall 270 at a location about 10% of the height H away from the closed end 220. The open end 230 can be threaded. The open end 230 can be threaded on an outer surface of the open end 230. The open end 230 can be threaded on an inner surface of the open end 230. The neck portion 260 can comprise two longitudinally extending flashings 133 projecting away from the longitudinal axis L on opposite sides of the neck portion 260.

The label 500 can comprise a label substrate 510 and ink 520. The label 500 can be applied the web 30 before forming the web 30 into loose conduit 40. Optionally, the label 500 can be applied to the loose conduit 40 or preform 600. When the preform 600 is converted into the container 200, the label 500 can be stretched concurrently with the container wall 270. If the label 500 is applied to the web 30, loose conduit 40, or preform 600, the label 500 can be a distortion printed label 500. A distortion printed label 500 is a label in which the image printed on the label is distorted in a manner to account for the stretched dimensions of the label 500 so that when the label 500 is stretched the image is scaled as desired.

The label 500 can optionally be applied to the blow molded container 200 after blowing the container 200. The label 500 can be an adhesive label. An adhesive label can comprise a label substrate 510 and the label substrate 510 has adhesive on the back of the label substrate 510 that connects the label substrate 510 to the container wall 270.

The label 500 can also be an in-mold label. An in-mold label is placed against a wall in the blow mold 170 prior to converting the preform 600 into the container 200. The preform 600 is blown into conformance with the blow mold 170 and the in-mold label. The in-mold label is bonded to the container wall 270 by the melted thermoplastic material forming the container wall thermally bonding with the in-mold label or by an adhesive on the back of the in-mold label or by an adhesive or low melt temperature thermoplastic that is part of the in-mold label.

The label 500 can be bonded to the container wall 270. For example, the label 500 can be solvent bonded, thermally bonded, adhesively bonded, or otherwise bonded to the container wall 500.

EXAMPLES AND COMBINATIONS

An example is below:
- A. A container (200) comprising:
    - an open end (230);
    - a closed end (220) opposing said open end;
    - a container wall (270) extending longitudinally between said closed end and said open end about a longitudinal axis (L);
    - an end seam (295) extending at least partially across said closed end;
    - a longitudinal overlapping seam (300) extending from said end seam, a portion of said overlapping seam extending from said end seam and longitudinally along said container wall; and
    - a mold part line (205) extending from said closed end to said open end;
    - wherein said open end is narrower than at least a portion of said container away from said open end of said container;
    - wherein said closed end and said container wall consist of a one-piece thermoplastic substrate (210);
    - wherein said container has a height (H) extending between said closed end and said open end;
    - wherein said overlapping seam along said container wall has an overlap magnitude (430) at a location about 10% of the height away from said closed end; and
    - wherein at a location about 10% of the height away from said closed end said mold part line and said overlapping seam are within a distance of one another of less than about five times said overlap magnitude.
- B. The container according to Paragraph A, wherein said part line protrudes from said container wall.
- C. The container according to Paragraph A or B wherein said container comprises an additional mold part line extending from said closed end to said open end.
- D. The container according to Paragraph C, wherein said mold part lines are on opposite sides of said container.
- E. The container according to any of Paragraphs A to D, wherein said container further comprises a label (500) spaced apart from said overlapping seam and said mold part line.
- F. The container according to Paragraph E, wherein said label comprises a label substrate (510) and ink (520).
- G. The container according to Paragraph E or F, wherein said label is an in-mold label.
- H. The container according to Paragraphs E to G, wherein said label is bonded to said container wall.
- I. The container according to Paragraphs E and H, wherein said label is an adhesive label.
- J. The container according to any of Paragraphs A to I, wherein said container wall extends around a longitudinal axis (L);
    - wherein at mid-height along said longitudinal axis said container has a local maximum internal dimension (LMAXID) orthogonal to said longitudinal axis, a local major axis (LMJA) coincident with said local maximum internal dimension, a local minor axis (LMA) orthogonal to said local major axis and said longitudinal axis, a local minor internal dimension (LMID) coincident with said local minor axis, and a local aspect ratio defined as a ratio of said local maximum internal dimension to said local minor internal dimension, wherein said local aspect ratio is greater than about 1.
- K. The container according to Paragraph J, wherein said mold part line is nearer to where a front plane (206) defined by said local major axis and said longitudinal axis intersects said container wall than where a sagittal plane (207) defined by said local minor axis and said longitudinal axis intersects said container wall.
- L. The container according to Paragraph K, wherein said mold part line is substantially coincident with where said front plane intersects said container wall.
- M. The container according to any of Paragraphs J to L, wherein said local aspect ratio is greater than 1.3.
- N. The package according to any of Paragraphs A to M, wherein said thermoplastic substrate comprises a composition selected from the group consisting of polyethylene terephthalate, polystyrene, polypropylene, polyethylene, polyvinyl chloride, nylon, ethyl vinyl alcohol, and mixtures thereof.
- O. The package according to any of Paragraphs A to N, wherein at a location that is about 10% of the height away from said closed end said container wall has a thickness away from said overlapping seam and said overlap magnitude is more than about 1.5 times said thickness of said container wall as measured at a distance from said overlapping seam equal to said overlap magnitude.
- P. The package according to any of Paragraphs A to O, wherein said container wall has a thickness away from said overlapping seam, wherein said overlapping seam at a location that is about 10% of said height away from said closed end is thicker than any other portion of said container wall at a location that is about 10% of said height away from said closed end.

Q. A container (200) comprising:
- an open end (230);
  - a closed end (220) opposing said open end;
  - a container wall (270) extending longitudinally between said closed end and said open end about a longitudinal axis (L);
  - an end seam (295) extending at least partially across said closed end; and
  - a longitudinal overlapping seam (300) extending from said end seam, a portion of said overlapping seam extending longitudinally along said container wall between said closed end and a neck portion (260) proximal said open end, wherein said overlapping seam has an overlap magnitude (430) that varies as a function of distance from said closed end and said overlap magnitude is at a minimum proximal said open end;
  - wherein said open end is narrower than at least a portion of said container away from said open end of said container;
  - wherein said closed end and said container wall consist of a one-piece thermoplastic substrate (210); and
  - wherein said open end is a calibrated neck (194), said calibrated neck (194) has an inside diameter (ID) spanning said open end, and said inside diameter has a tolerance within plus or minus about 2% of said inside diameter.

R. The container according to Paragraph Q, wherein said container has a height (H) extending between said open end and said closed end and said container wall has a thickness away from said overlapping seam, wherein at a location that is about 10% of said height away from said closed end said overlapping seam along said container wall has an overlap magnitude (430) of more than about 1.5 times said thickness of said container wall as measured at a distance from said overlapping seam equal to said overlap magnitude S. The container according to Paragraph Q or R, wherein said neck portion comprises two partially longitudinally extending flashing lines (134) on opposite sides of said neck portion.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A container comprising:
   - an open end;
   - a closed end opposing said open end;
   - a container wall extending longitudinally between said closed end and said open end about a longitudinal axis;
   - an end seam extending at least partially across said closed end;
   - a longitudinal overlapping seam extending from said end seam, a portion of said overlapping seam extending from said end seam and longitudinally along said container wall; and
   - a mold part line extending from said closed end to said open end;
   - wherein said open end is narrower than at least a portion of said container away from said open end of said container;
   - wherein said closed end and said container wall consist of a one-piece thermoplastic substrate;
   - wherein said container has a height extending between said closed end and said open end;
   - wherein said overlapping seam along said container wall has an overlap magnitude (430) at a location about 10% of the height away from said closed end; and
   - wherein at a location that is about 10% of the height away from said closed end said mold part line and said overlapping seam are within a distance of one another of less than about five times said overlap magnitude.

2. The container according to claim 1, wherein said part line protrudes from said container wall.

3. The container according to claim 1, wherein said container comprises an additional mold part line extending from said closed end to said open end.

4. The container according to claim 3, wherein said mold part lines are on opposite sides of said container.

5. The container according to claim 1, wherein said container further comprises a label spaced apart from said overlapping seam and said mold part line.

6. The container according to claim 5, wherein said label comprises a label substrate and ink.

7. The container according to claim 6, wherein said label is an in-mold label.

8. The container according to claim 6, wherein said label is bonded to said container wall.

9. The container according to claim 6, wherein said label is an adhesive label.

10. The container according to claim 1,
   - wherein said container wall extends around a longitudinal axis;
   - wherein at mid-height along said longitudinal axis said container has a local maximum internal dimension orthogonal to said longitudinal axis, a local major axis coincident with said local maximum internal dimension, a local minor axis orthogonal to said local major axis and said longitudinal axis, a local minor internal dimension coincident with said local minor axis, and a local aspect ratio defined as a ratio of said local maximum internal dimension to said local minor internal dimension, wherein said local aspect ratio is greater than about 1.

11. The container according to claim 10, wherein said mold part line is nearer to where a front plane defined by said local major axis and said longitudinal axis intersects said container wall than where a sagittal plane defined by said local minor axis and said longitudinal axis intersects said container wall.

12. The container according to claim 11, wherein said mold part line is substantially coincident with where said front plane intersects said container wall.

13. The container according to claim 10, wherein said local aspect ratio is greater than 1.3.

14. The package according to claim 1, wherein said thermoplastic substrate comprises a composition selected from the group consisting of polyethylene terephthalate, polystyrene, polypropylene, polyethylene, polyvinyl chloride, nylon, ethyl vinyl alcohol, and mixtures thereof.

15. The package according to claim 1, wherein at a location that is about 10% of the height away from said closed end said container wall has a thickness away from said overlapping seam and said overlap magnitude is more than about 1.5 times said thickness of said container wall as measured at a distance from said overlapping seam equal to said overlap magnitude.

16. The package according to claim 1, wherein said container wall has a thickness away from said overlapping seam, wherein said overlapping seam at a location that is about 10% of said height away from said closed end is thicker than any other portion of said container wall at a location that is about 10% of said height away from said closed end.

* * * * *